US005604489A

United States Patent [19]

Hyatt, Jr.

[11] Patent Number: 5,604,489

[45] Date of Patent: Feb. 18, 1997

[54] ALPHANUMERIC INPUT TERMINAL

[75] Inventor: Richard G. Hyatt, Jr., Shawsville, Va.

[73] Assignee: Medeco Security Locks, Inc., Salem, Va.

[21] Appl. No.: 958,710

[22] Filed: Oct. 9, 1992

[51] Int. Cl.$^6$ .............................. G06F 7/04; E05B 49/00

[52] U.S. Cl. .............................. 340/825.56; 340/825.31; 70/277; 70/278

[58] Field of Search ................ 70/277, 278; 340/825.31, 340/825.56; 380/23, 25

[56] References Cited

U.S. PATENT DOCUMENTS

| | | | |
|---|---|---|---|
| 3,812,403 | 5/1974 | Gartner | 70/278 |
| 4,745,784 | 5/1988 | Gartner | 70/277 |
| 4,819,267 | 4/1989 | Cargile et al. | 380/23 |
| 4,857,914 | 8/1989 | Thrower | 340/825.31 |
| 4,899,562 | 2/1990 | Gartner et al. | 70/277 |
| 4,967,305 | 10/1990 | Murrer et al. | 70/278 |
| 5,061,923 | 10/1991 | Miller et al. | 340/825.31 |
| 5,177,789 | 1/1993 | Covert | 380/23 |

*Primary Examiner*—Michael Horabik
*Assistant Examiner*—Edward Merz
*Attorney, Agent, or Firm*—Rothwell, Figg Ernst & Kurz

[57] ABSTRACT

An alphanumeric input terminal is provided which allows a user to enter a sequence of characters that is compared to a stored valid entry code to determine whether access should be granted. The terminal displays a random number which the user adjusts by a rotatable knob to obtain a desired character. The character is entered by pushing the knob. The entered character is no longer displayed and the terminal displays another random character which is similarly adjusted and entered. This prevents observation of the characters being entered since only one character is displayed at any one time. By initially displaying a random character for each entry position, the adjustment made by the user to reach the selected character is different every time. This prevents one from determining the selected character by observing the direction and extent that the user rotates the knob before entering the character.

8 Claims, 3 Drawing Sheets

ALPHANUMERIC INPUT TERMINAL

BACKGROUND OF THE INVENTION

1. Field of the Invention

The present invention relates to electronic input terminals for entering access codes to open a locked door or the like. More specifically, the invention relates to such terminals in which a rotatable and axially movable knob is used to enter a coded sequence of numerals or alphanumeric symbols.

2. Description of the Prior Art

It is known to provide a door with an electronic input terminal having a knob that can be manipulated through two degrees of movement, rotation and axial displacement, to select and enter elements of a coded sequence. See for example U.S. Pat. Nos. 4,899,562 and 4,745,784. The knob is rotated to select a number and is then pushed to contact a circuit board which generates an electrical signal to a solenoid. The solenoid controls movement of a member which releases the lock to allow the door to be opened.

The electronic door lock of the '562 patent includes a liquid crystal display. The knob is rotated to select a number corresponding to an element of a coded sequence, and is then pushed to input the number. The inputted numbers are displayed by the liquid crystal display. Because the knob of the lock is also used to retract a bolt, the rotation of the knob is severely limited. As a result, the knob can only be used to select from ten digits. Additionally, the numbers selected are not displayed until after they have been inputted to the reader circuit.

SUMMARY OF THE INVENTION

The present invention provides an electronic alphanumeric input terminal which is used to enter numerals or alphanumeric symbols corresponding to a coded sequence to unlock a door or the like. The input terminal communicates with a microprocessor in which are stored valid entry codes for comparison to the numerals or symbols entered at the terminal.

The input terminal of the present invention includes several safety features to prevent undesired viewing of the numerals or symbols that are entered. Only one character, which as used herein includes numerals or alphanumeric symbols, is displayed at any point in time to prevent observation of the entered sequence.

The input terminal initially displays a random character which the user increments or decrements by rotating a knob to arrive at a selected character. Once this selected character is obtained, it is input by pushing the knob inwardly. Upon inputting of the selected character, the terminal displays a different random character in its place. This prevents observation of the selected character, and also prevents deduction of an entry code by observing a sequence of knob rotation, since the necessary rotations to arrive at the correct input will be random.

In one embodiment of the present invention, there is provided a display space for each element of the coded sequence. The user increments or decrements the random character displayed through clockwise or counterclockwise rotation of the knob and then depresses the knob to input the selected character.

The terminal then displays a blocking character, such as the letter X, in the corresponding display space once the selected character has been entered. This blocking character confirms to the user that the character selected has been entered, and also prevents observation of the selected character while the user manipulates the knob to input the remaining characters of the coded sequence. As each selection after the first is input, a blocking character is displayed in its place so that only one selected character is displayed at any one point in time.

In another embodiment, the present invention includes a single character display which initially presents the user with a first random character. This character is incremented/decremented to arrive at a first selected character corresponding to one entry of a coded sequence. The user inputs the first selected character and the terminal then displays a second random character. The second random character is then adjusted to arrive at a second selected character which corresponds to another entry of the coded sequence. With this arrangement, once the selected character is inputted by the user it is no longer displayed. Thus, observation of the sequence of selected characters is prevented.

This embodiment may have indicators corresponding to the positions of the elements of the entered sequence to show that a character has been input in a particular position. This allows the user to keep track of the characters which have been entered without display of those characters.

The input terminal of the present invention provides a secure means of accessing doors or the like and is of a reduced size suitable for limited space applications and easy installation. Security is enhanced by use of the random number generation by the terminal. This feature prevents an unauthorized observer from memorizing any sequence of knob rotation by a user to thereby deduce the entry access code.

DETAILED DESCRIPTION OF THE DRAWINGS

Figure 1:
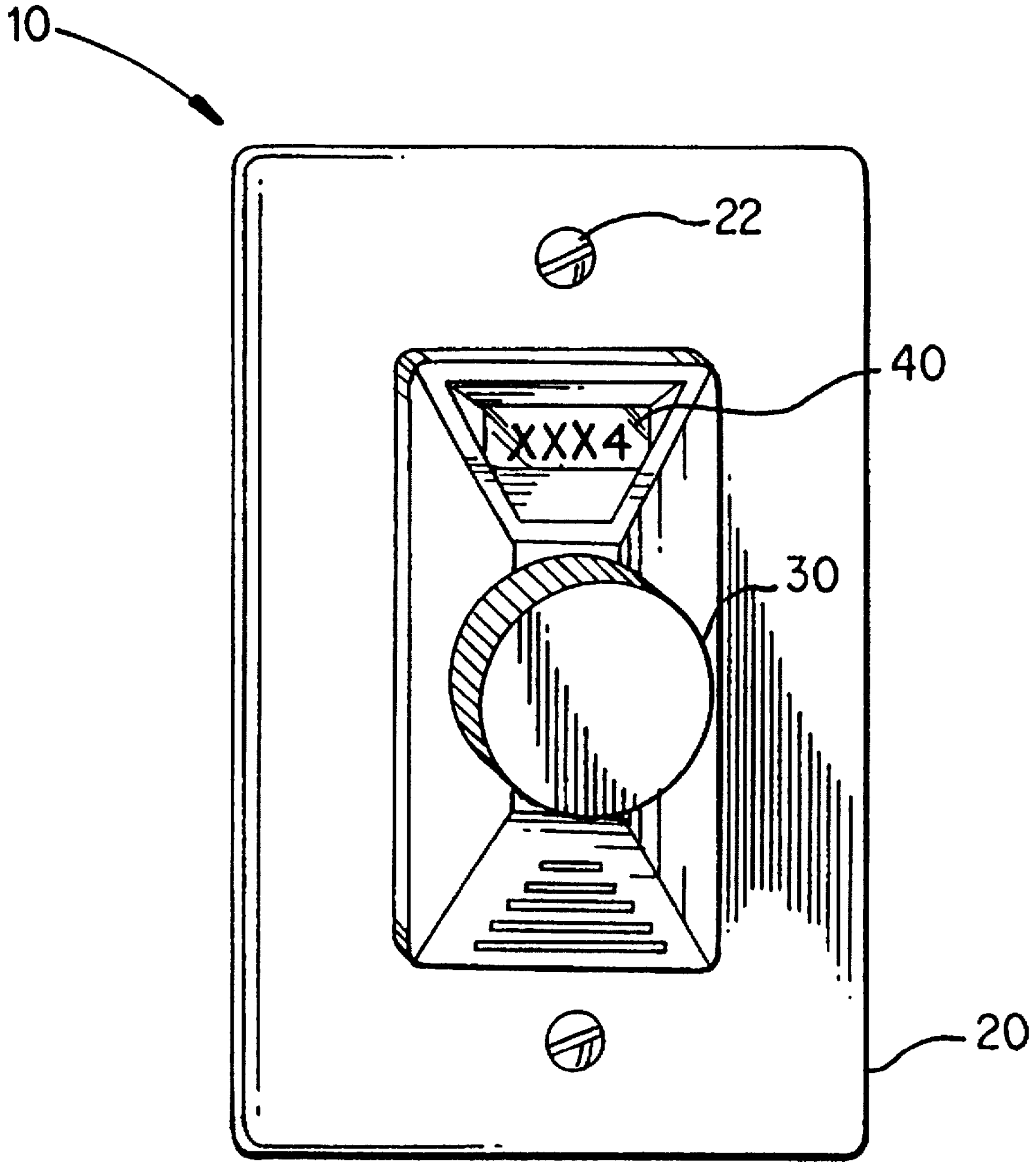
FIG. 1 is a front view of a first preferred embodiment of the alphanumeric input terminal of the present invention.

With reference to FIG. 1, an alphanumeric input terminal 10 according to a first embodiment of the present invention includes a base 20 which is secured to a door or some other lockable structure (not shown). The base 20 is attached by conventional fastening means, such as screws 22. A knob switch/selector 30 projects from the base 20 and is manipulable in two degrees of movement relative to the base 20. The knob 30 is both rotatable and axially displaceable so that it can be both rotated and depressed toward the plate 20. Rotation of the knob serves to increment or decrement the display character/digit and depressing the knob causes the displayed character to be inputted to the reader.

A display 40, which can take the form of an LCD (liquid crystal display), LED (light emitting diode) or any other suitable type of alphanumeric display is disposed adjacent the knob 30. Upon the user initially depressing the knob 30, the display 40 presents a random character. This random character is generated by a microprocessor or other suitable random character generator, and is adjusted by being incremented or decremented through rotation of the knob 30. After adjusting the random character to arrive at a selected character, the user inputs the selected character by pushing the knob 30 inwardly.

As the knob 30 is rotated the user can feel a clicking, but the speed at which the characters are incremented or decremented is not directly correlated to the "feel" of the rotation. The correlation of the speed and distance which the knob 30 is turned to the adjustment of the displayed character is such that the slower the knob 30 is turned, the greater the distance it must be turned to increment or decrement the character. As a result, any accidental slight rotation during depression of the knob 30 will not cause an incorrect character to be entered, as commonly occurs in mechanical combination locks with rotary dials.

Once the selected character, obtained by adjusting the first random character, has been inputted by depressing the knob 30, the display shows a blocking character in the first display position in place of the selected character. The blocking character can take the form of any numeral or alphanumeric symbol. It is significant that the selected character corresponding to an element of the coded sequence not be visible after entry. FIG. 1 shows the letter X displayed in the first three positions of the four digit display, signifying that the user has input three characters of the sequence.

Upon entry of the first selected character and the display of a blocking character in its place, the display 40 displays a second random character in the second display position. This second random character is generated and in the same manner as the first to arrive at a second selected character corresponding to an element of the coded sequence. This second selected character is entered by depressing the knob 30, causing a blocking symbol to be displayed in place of the second character and a third random character to be displayed in the third display position. The adjustment process is repeated to arrive at a third selected character which is entered by pushing the knob 30. This procedure is carried out for each element of the coded sequence.

Figure 3:
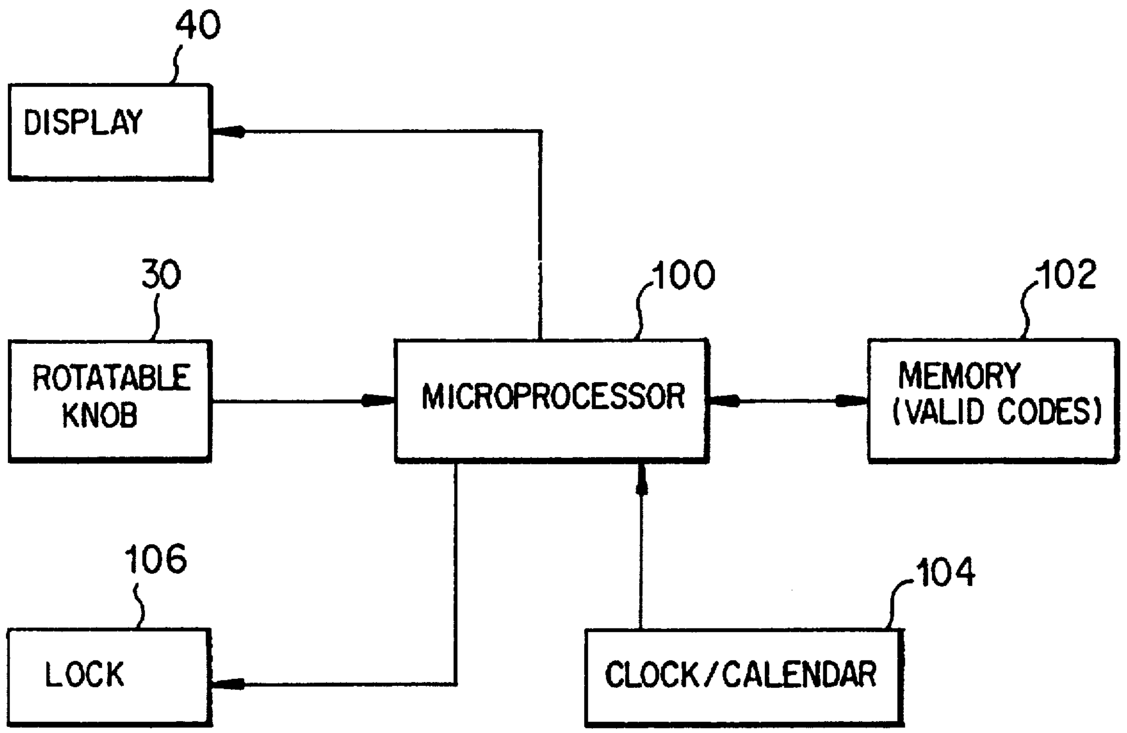
FIG. 3 is a simplified schematic of a circuit for operating the alphanumeric input terminal of the present invention according to one preferred embodiment.

Referring to FIG. 3, when the selected character corresponding to the final position of the coded sequence is entered, the inputted sequence is compared by a microprocessor 100 to stored valid entry codes which are stored in a memory 102. Upon entry of the proper sequence, the microprocessor communicates an output signal to operate the lock mechanism 106 to provide access. The input terminal of the present invention can be free standing with the necessary components located at the access site, or it can be a slave to a central system remotely located apart from the access site.

By initially displaying a random character for each entry position, the adjustment made by the user to reach the selected character is different every time. This prevents one from determining the selected character by observing the direction and extent that the user rotates the knob before entering the character.

Figure 2:
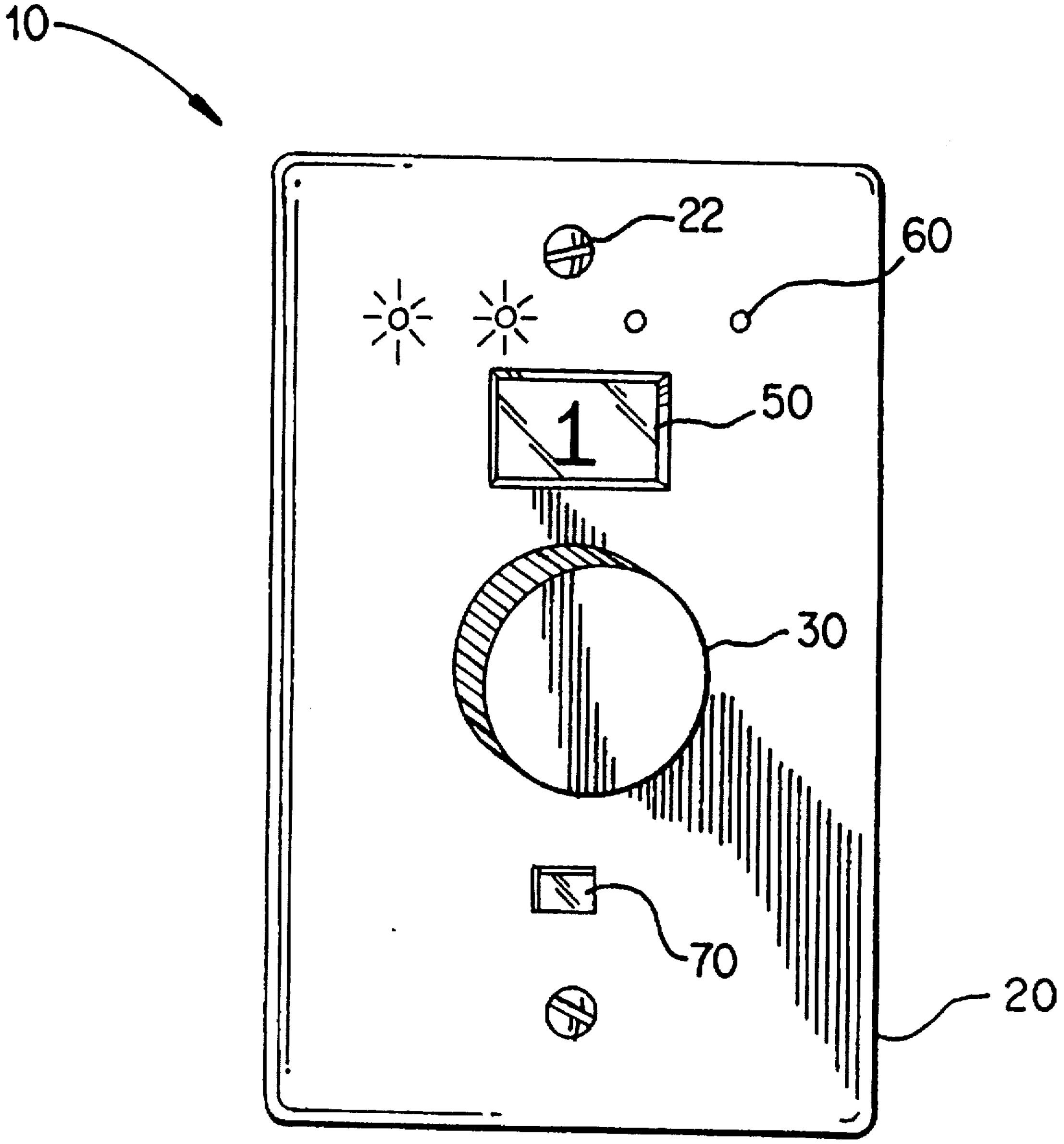
FIG. 2 is a front view of a second preferred embodiment of the alphanumeric input terminal of the present invention.

A second embodiment of the input terminal of the present invention is shown in FIG. 2, wherein like reference numerals are used to depict like features with regard to FIG. 1. The input terminal 10 of FIG. 2 includes a rotatable knob 30 which is operated to adjust and enter selected characters as it was in the embodiment of FIG. 1. The input terminal 10 of FIG. 2, however, utilizes a different display arrangement 50. Whereas the embodiment of FIG. 1 comprises a plurality of display positions corresponding to the number of elements in the coded sequence, display 50 shows only one character at a time.

The display 50 presents a random character which the user adjusts as in the previous embodiment. When the selected character is entered by pushing the knob 30, the display 50 cannot display a blocking symbol since only one display position is present. The display 50 instead displays the second random character which is then adjusted by the knob 30 as described above. Indicators 60, which can be in the form of LED's (light emitting diodes), are provided so that there is an LED for each element of the coded sequence. Upon the user entering each selected character corresponding to an element of the sequence, one of the indicators 60 is activated to show that a character for that position has been entered. In FIG. 2, two characters have been entered.

The character selected and entered by the user cannot be observed as the display 50 replaces the character with the next random character. When all of the selected characters have been entered the sequence is downloaded to the microprocessor for comparison with the stored valid entry codes. An access indicator 70 indicates that a valid sequence of selected characters has been entered to open the locked door or the like.

The present invention can utilize either numeric or alphanumeric characters. The ability to use the device in an alpha mode with letter characters allows a vast number of combinations to be used in a terminal having only a few display positions. This is opposed to conventional input terminals using numeric characters. This enhances the attractive space-saving feature of the present invention. It is apparent that the input terminal of the present invention provides a compact device capable of handling a large number of combinations, while providing increased security by preventing observation of the characters selected and entered by the user.

The invention having been thus described, it will become apparent to those skilled in the art that the same may be varied in many ways without departing from the spririt of the invention. Any and all such modifications are intended to be included within the scope of the following claims.

I claim:

1. An electronic input terminal, comprising:

means for generating a random alphanumeric character;

display means for displaying a first generated random alphanumeric character at a first position thereon;

adjustment means for incrementing or decrementing the first generated random alphanumeric character displayed on said display means to obtain a first selected alphanumeric character displayed by said display means;

input means for entering said first selected alphanumeric character to comparing means;

said display means further including means for preventing the first selected alphanumeric character from being viewed on said display means after said first selected alphanumeric character has been entered by said input means, and for displaying at least a second random alphanumeric character generated by said generating means at a second position thereon upon entry of said first selected alphanumeric character which second random alphanumeric character can be adjusted by said adjustment means to obtain a second selected alphanumeric character which is entered to said comparing means by activation of said input means;

wherein said preventing means comprises means for displaying a blocking symbol at said first position on said display means occupied by said first selected alphanumeric character upon entry of said first selected alphanumeric character by said input means;

means for storing a valid entry code;

said comparing means for comparing the first and second entered alphanumeric characters to a valid entry code stored in said means for storing to determine if access is permitted, and outputting a signal if the entered characters match the stored valid entry code; and access means responsive to said signal for allowing access to a user of said terminal.

2. The input terminal of claim 1 wherein said display means includes a liquid crystal display which displays the blocking symbol.

3. The input terminal of claim 1 wherein said adjustment means is a rotatable knob which is rotated to adjust the displayed random character.

4. The input terminal of claim 3 wherein said input means responds to axial depression of said rotatable knob to enter the selected random character.

5. The input terminal of claim 1 wherein said adjustment means and said input means include a rotatable and axially movable knob which is rotated for adjustment and moved axially for inputting.

6. A method of providing access through an electronic input terminal upon entry of a predetermined coded sequence, comprising the steps of:

a) displaying a random character in one of at least two sequenced positions on the input terminal;

b) adjusting the random character to correspond to a particular element of a coded sequence;

c) entering the adjusted character into said terminal;

d) displaying a symbol different from the adjusted character in place of the adjusted character in the one position after said entering step;

e) displaying at least a second random character in a second of said plurality of sequenced positions and repeating steps b) through d) for the second random character;

f) comparing the adjusted characters entered in the input terminal to a stored valid entry code to determine if access should be granted; and g) granting access to a user upon matching of the entered adjusted characters to said stored valid entry code.

7. A method of inputting an access code in an electronic input terminal which provides access upon entry of a valid coded sequence, comprising the steps of:

a) displaying a first random character in a display area of the input terminal;

b) adjusting the first random character to obtain a first adjusted character corresponding to a particular element of a coded sequence;

c) entering the first adjusted character into said terminal;

d) displaying a second random character in place of the first adjusted character in the display area so that said first adjusted character cannot be viewed after being entered, while usually indicating on the input terminal that the first adjusted character has been entered;

e) repeating steps b) and c) for the second random character;

f) comparing the selected characters entered in the input terminal to a stored valid entry code to determine if access should be granted; and g) granting access to a user upon matching of the entered adjusted characters to said stored valid entry code.

8. An electronic input terminal, comprising:

means for generating a random alphanumeric character;

display means for displaying a first generated random alphanumeric character;

adjustment means for incrementing or decrementing the first generated random alphanumeric character displayed on said display means to obtain a first selected alphanumeric character displayed by said display means;

input means for entering said first selected alphanumeric character to comparing means;

said display means further including means for preventing the first selected alphanumeric character from being viewed on said display means after said first selected alphanumeric character has been entered by said input means, and for displaying at least a second random alphanumeric character generated by said generating means upon entry of said first selected alphanumeric character which second random alphanumeric character can be adjusted by said adjustment means to obtain a second selected alphanumeric character which is entered to said comparing means by activation of said input means;

wherein said preventing means comprising means for displaying said second random alphanumeric character in place of said first selected alphanumeric character upon entry thereof by said input means;

means for indicating entry of each of said selected alphanumeric characters by said input means;

means for storing a valid entry code;

said comparing means for comparing the first and second entered alphanumeric characters to a valid entry code stored in said means for storing to determine if access is permitted, and outputting a signal if the entered characters match the stored valid entry code; and access means response to said signal for allowing access to a user of said terminal.

* * * * *